May 21, 1929.  E. C. ALBRIGHT  1,714,289
LAMP CONSTRUCTION
Filed Jan. 14, 1928
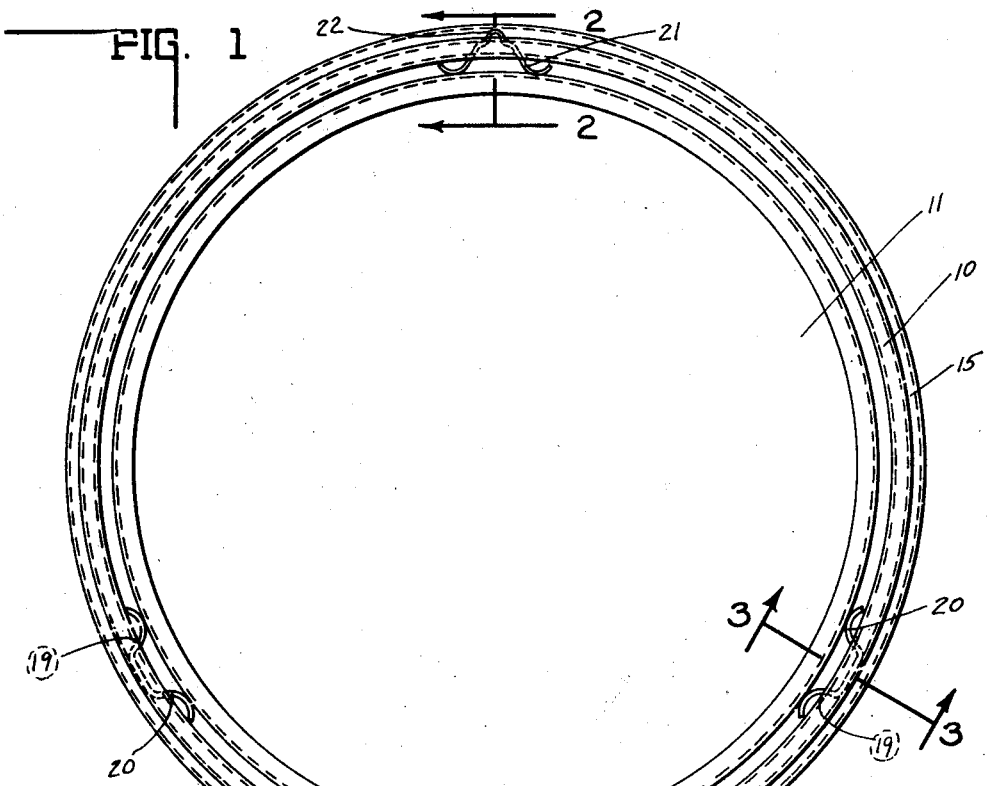
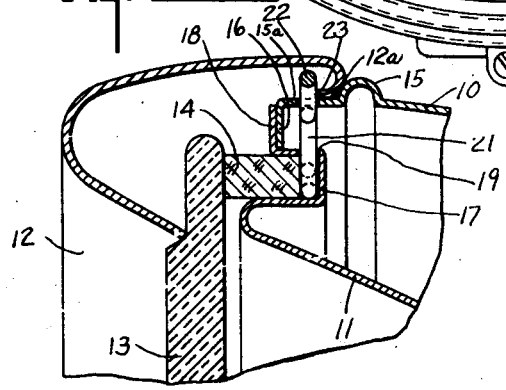
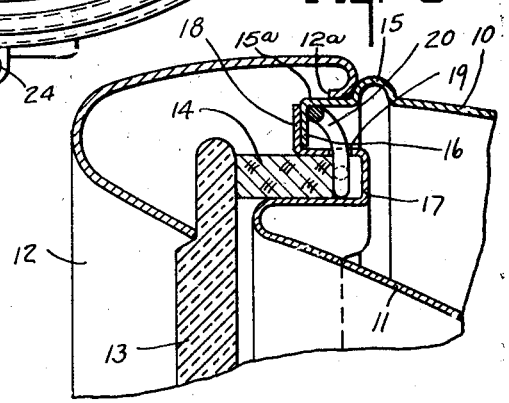
INVENTOR.
EDWARD C. ALBRIGHT.
BY
ATTORNEYS.

Patented May 21, 1929.

1,714,289

UNITED STATES PATENT OFFICE.

EDWARD C. ALBRIGHT, OF CONNERSVILLE, INDIANA, ASSIGNOR TO INDIANA LAMP CORPORATION, OF CONNERSVILLE, INDIANA, A CORPORATION.

LAMP CONSTRUCTION.

Application filed January 14, 1928. Serial No. 246,817.

This invention relates to a lamp construction and particularly vehicle lamps of the usual type.

The object of the invention is to provide a relatively simple construction adapted to eliminate the expense of tapping the lamp bodies and providing screws therefor as well as facilitating the assembly of the lamp case and reflector. This is obtained by providing a plurality of spring members so formed and positioned as to snap into place and secure the reflector and case together under spring tension, and also providing a top hook for the door rim which will secure the same under spring tension when the door rim is locked in closed position.

The full nature of the invention will be understood from the accompanying drawings and the following description and claims:

Fig. 1 is a front elevation of a lamp structure with portions thereof removed. Figures 2 and 3 are sections taken on the lines 2—2 and 3—3 respectively, with the door rim, lens and gasket shown positioned relative thereto.

In the drawings there is shown portions of an automobile lamp having a casing 10, reflector 11, door rim 12, lens 13 and gasket 14.

The casing is provided with an annular bead 15 extending about its periphery adjacent the open face thereof. The free edge of the casing at its open face is turned inwardly to provide the inwardly extending annular flange 16. Between the bead and flange is the annular seat $15^a$. The reflector 11 is formed with a gasket seat 17 forming an annular and inwardly extending recess for receiving the gasket 14, said seat terminating in an outwardly extending annular flange 18. The inner edge of flange 16 is such that the annular gasket seat 17 fits snugly therein while the flange 18, lies immediately adjacent to flange 16 and abuts the outer surface thereof. Thus, the reflector is centered within the casing.

The outer wall of the gasket seat 17 is pierced to provide a slot 19. Three of said slots are provided at substantially equal distances apart as shown in Fig. 1, through which the spring members 20 and 21 are adapted to extend. Said spring members are formed with curved legs resting against the inner surface of the inner wall of the gasket 17. Shoulders of the members extend through the slots 19 into engagement with the inner surface of rim seat $15^a$ of the casing 10. Thus, the reflector is locked thereby within said casing.

The spring member 21 which is positioned at the top of the lamp is formed with a head 22 adapted to extend through the slot 23 formed in the rim seat $15^a$ at the top of the casing to receive the same between the bead 15 and flange 16. The forwardly directed inner flange $12^a$ of the rim engages finger 21 at 22 and the rim 12 is locked on its seat $15^a$.

In assembling the lamp, the reflector having been positioned and locked by the spring members within the casing, the annular gasket 14 is placed in the gasket seat 19 so as to abut said spring members. The lens 13 is placed in the door rim 12 whereupon the upper portion of the door rim is brought into engagement with the rear of the spring 22 so as to be engaged and locked thereby in position to abut the bead 15. The bottom of the door rim is forced inwardly and locked in closed position by the screw 24 at the bottom thereof, or any other suitable means.

From the above it will be noted that the three spring members act to engage and hold the reflector and casing in centered and abutting position under spring tension exerted when the gasket 14 is forced against the spring members, and one of the spring members is further utilized to provide a resilient hook over which the top of the door member may be engaged.

The invention claimed is:

1. In combination with a casing having a rim receiving and limited seat at its outer end, a reflector therein having a gasket receiving groove adjacent its outer end, a gasket in the groove, a lens closure engaging the gasket, and a rim engaging the closure and telescopically mounted upon the seat, of an inwardly directed flange upon the rim of the seat, an outwardly directed abutting flange upon the reflector adjacent the gasket groove forming portion, and a plurality of U-shaped spring members each bearing upon the inner face of the seat and extending through the outer portion of the groove forming portion of the reflector and bearing upon the inner portion of the groove forming portion of the reflector.

2. In combination with a casing having a rim receiving and limited seat at its outer end, a reflector therein having a gasket receiving groove adjacent its outer end, a gasket in the groove, a lens closure engaging the gasket, and a rim engaging the closure and telescopically mounted upon the seat, of an inwardly directed flange upon the rim of the seat, an outwardly directed abutting flange upon the reflector adjacent the gasket groove forming portion, and a plurality of U-shaped spring members each bearing upon the inner face of the seat and extending through the outer portion of the groove forming portion of the reflector and bearing upon the inner portion of the groove forming portion of the reflector, the rim receiving seat being apertured and one of said U-shaped spring members including an extension extending through the rim seat aperture and engageable by the seat receivable portion of the rim for locking the rim to the casing.

In witness whereof, I have hereunto affixed my signature.

EDWARD C. ALBRIGHT.